Figure 1:
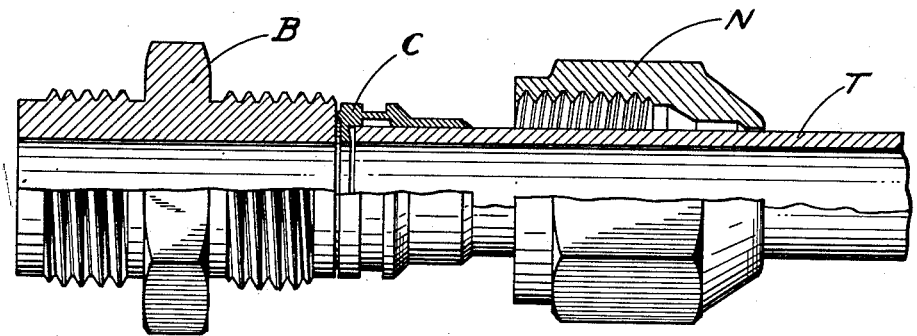

Nov. 2, 1954   P. D. WURZBURGER   2,693,374
PIPE COUPLING WITH DEFORMABLE RING FOR FLARELESS PIPE
Filed May 5, 1950   4 Sheets-Sheet 1

INVENTOR.
PAUL D. WURZBURGER
BY
ATTORNEYS

Nov. 2, 1954  P. D. WURZBURGER  2,693,374
PIPE COUPLING WITH DEFORMABLE RING FOR FLARELESS PIPE
Filed May 5, 1950  4 Sheets-Sheet 2
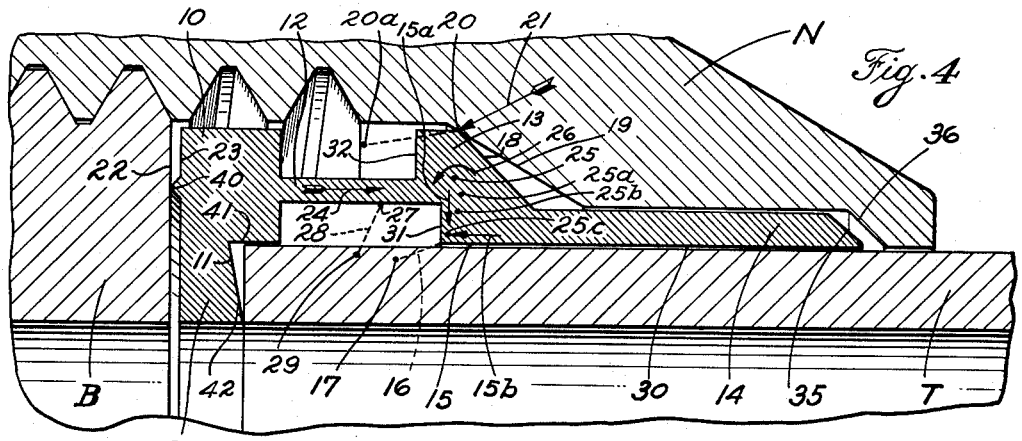
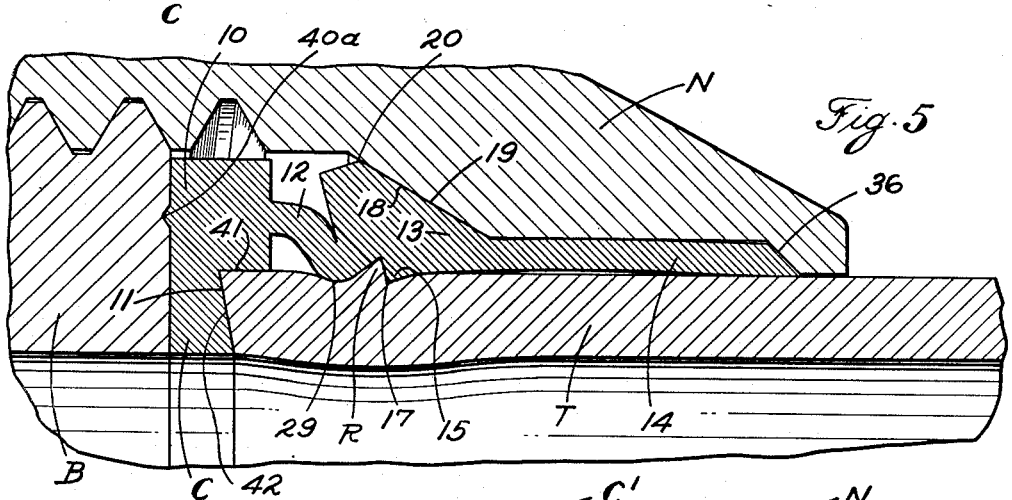
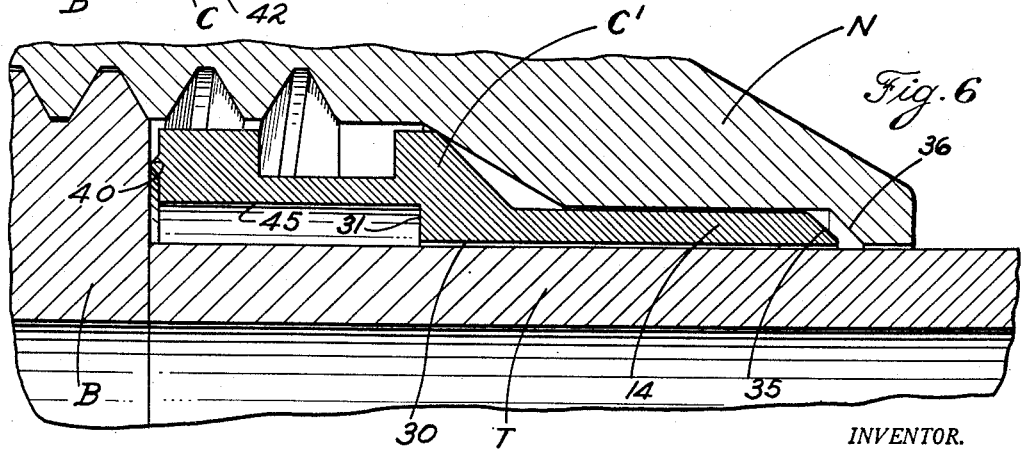
INVENTOR.
PAUL D. WURZBURGER
BY
ATTORNEYS Nov. 2, 1954     P. D. WURZBURGER     2,693,374
PIPE COUPLING WITH DEFORMABLE RING FOR FLARELESS PIPE
Filed May 5, 1950     4 Sheets-Sheet 3

INVENTOR.
PAUL D. WURZBURGER
BY
ATTORNEYS

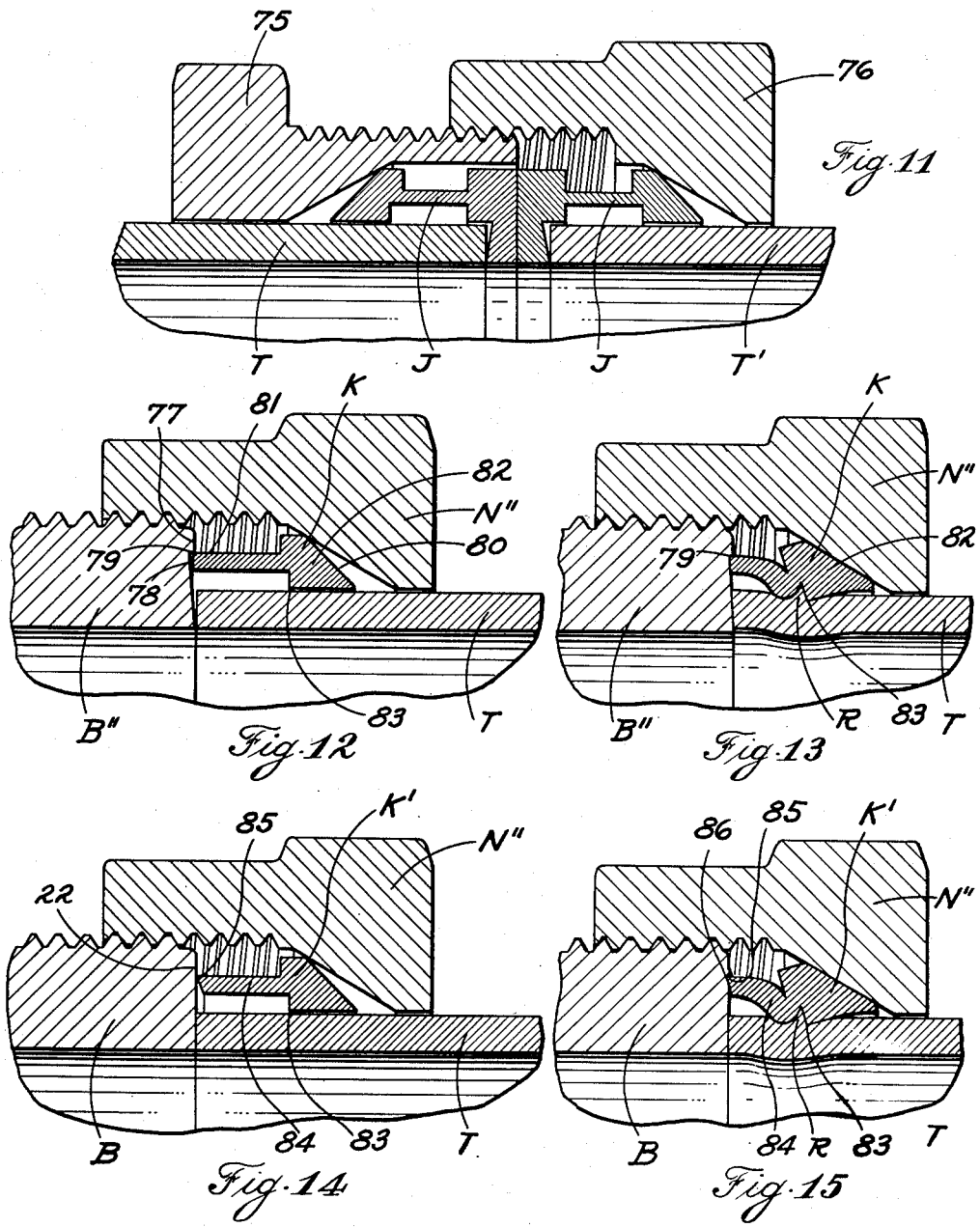

United States Patent Office 2,693,374
Patented Nov. 2, 1954

2,693,374

PIPE COUPLING WITH DEFORMABLE RING FOR FLARELESS PIPE

Paul D. Wurzburger, Cleveland Heights, Ohio

Application May 5, 1950, Serial No. 160,347

16 Claims. (Cl. 285—122)

This invention relates to improvements in the art of coupling and more particularly to tube or pipe couplings and fittings and the coupling elements thereof, and in certain respects comprises an improvement upon my prior inventions, certain of which are disclosed in U. S. Patents Nos. 2,414,184, 2,417,536 and 2,474,178.

It is among the objects of my invention to provide a coupling improving upon prior types of couplings or joints particularly as to fluid sealing and mechanical gripping virtues and facilities and, in addition, to provide the facility of a "close" coupling whereby the tube, piece or pipe to be coupled can be joined to or disconnected from the body or instrumentality with which it is connected or associated without substantial longitudinal motion or displacement; to provide a novel sealing and gripping element to seal and grip the tube to be coupled more effectively and without, or with less hazard, of constricting thin-walled tube undesirably or cutting into the wall of the tube more deeply than is necessary or desirable; to provide a coupling which during the operation of making the joint will reflect a "feel" to the operator that the joint has been completed as by a marked increase in wrench torque; to provide a coupling that does not necessarily require the provision of a flared mouth or conical camming surface interiorly of the body member but rather admits of employment or association with plain body members as well as with various standard forms of body members such as the body members of familiar compression and flared type fittings; to provide a coupling element useful in association with standard or flanged valve bodies and other instrumentalities without specially machining the same; to provide a coupling that is highly resistant to failure or deterioration from the deleterious influences of vibration; to provide a coupling having a cutting edge adapted to turn up a ridge of appreciable size from the wall of the tube or piece to be coupled wherewith to grip the same positively and securely, but also to restrict the depth of the cut and the size of the ridge and at the same time to grip and confine the ridge and to grip the tube adjacent the ridge and at a spaced distance from the cutting edge whereby to enhance the grip upon the tube and more firmly secure the tube mechanically and effect a more complete fluid seal and withal to limit more effectively the constriction of the tube incident to making the sealed joint.

Other objects include the provision of a gripping and sealing element within which actions and motions may be induced to effect a desirable apportionment of tube surface cutting, gripping, sealing and vibration resistant functions, and to provide for a separation of such functions when desired as making the fluid seal independently of the tube cutting and mechanical gripping. Another object is to provide a sealing and tube gripping element at least part of which may take a relatively fixed position with relation to the tube or pipe with which it is to be associated in the first instance and may by displacement and deformation of other parts of the element be worked into firm mechanical gripping and fluid sealing relation to the tube and for permanent attachment thereto for repeated connections and disconnections.

Another object is to provide a self-contained coupling element which within itself under the influence of longitudinally acting compressive forces converts and distributes those forces into gripping, cutting and sealing forces and motions to embrace the tube to be coupled and to substantially integrate the same in relation thereto. A further object is to provide a device which while having a principal utility as the coupling element for a tube coupling may also have additional utility not merely with tubes and coupling elements but also with other instrumentalities such as cylindrical rods, shafts, valve stems and the like upon which it may be desirable to substantially "integrate" external peripheral flanges or flanged projections for coaction with other instrumentalities, such as valve bonnets or glands, which may be related to it or them in more or less the same way that the familiar nut and body elements of the tube couplings are related to the coupled tubes, but not necessarily for the same purposes.

Figure 2:
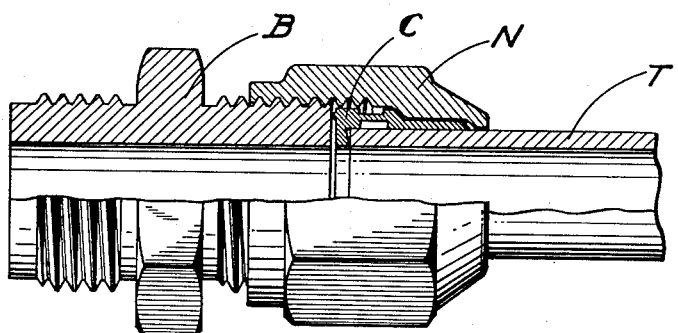
Figure 3:
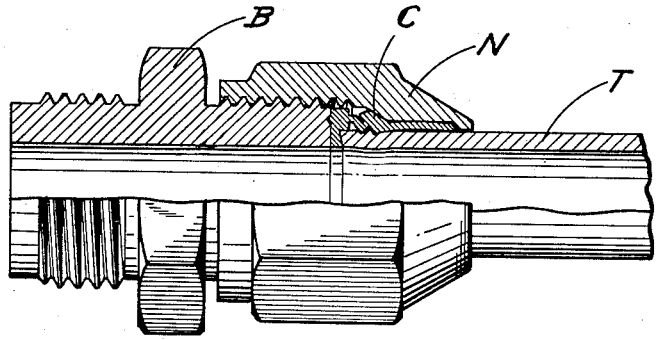
Figure 7:
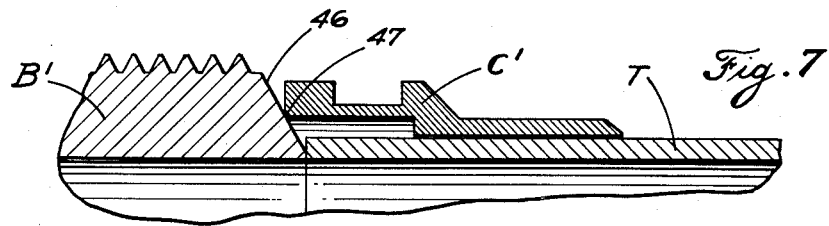
Figure 8:
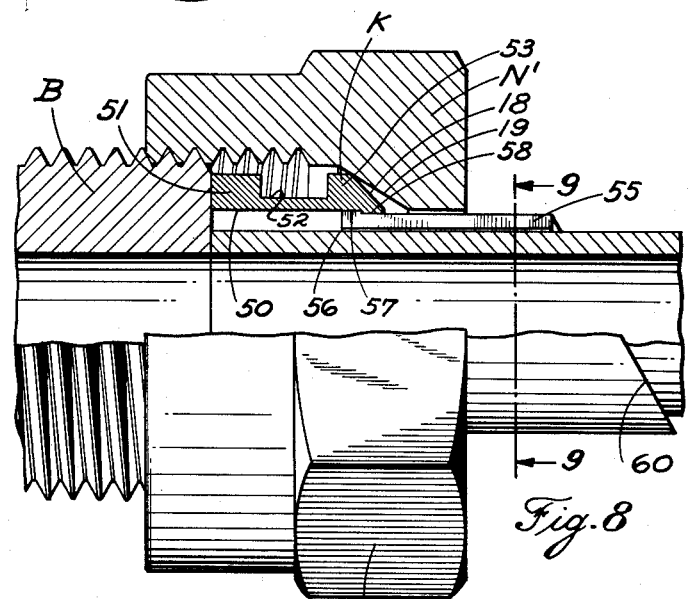
Figure 9:
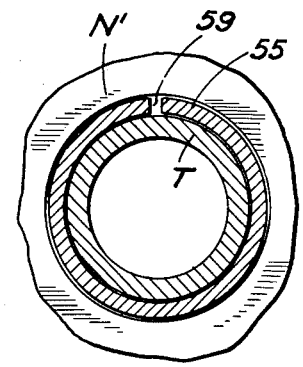
Figure 10:
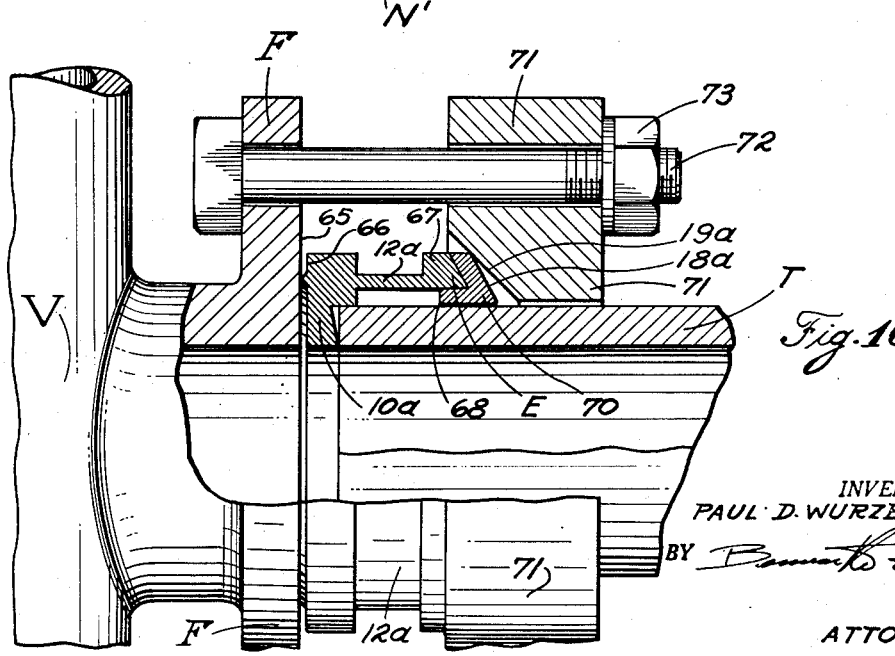

Other objects and advantages will appear from the following description of a preferred and certain modified form of my invention, reference being made to the accompanying drawings in which Figure 1 is a partly broken elevation and longitudinal section of body, nut, tube and coupling parts arranged and aligned preliminary to making a joint according to my invention; Figure 2 is a similar view with the parts in pre-assembled relation; Figure 3 is a similar view with the parts in a relation of the completed joint; Figure 4 is an enlarged fragmentary longitudinal section of the parts in the position of Figure 2; Figure 5 is a view similar to Figure 4 with the parts corresponding to the position shown in Figure 3; Figure 6 is a view similar to Figure 4 showing a modified form of coupling element; Figure 7 is a view approximately similar to Figure 4 of another modified form of my invention; Figure 8 is an enlarged view partly in elevation and partly in longitudinal section of another modified form of my invention; Figure 9 is a transverse sectional view taken in the plane of the line 9—9 of Figure 8; and Figure 10 is an elevation partly in longitudinal section of another modified form and modified environment of my invention; Figure 11 is a partial elevation and longitudinal section of an embodiment of my invention in the form of a straight union; Figure 12 is a partial elevation and longitudinal section of another modified form of my invention prior to making the joint; Figure 13 is a similar view of the same form after the joint has been made; Figure 14 is a view similar to Figure 12 showing a variant of that form of my invention with the parts in the position prior to making the joint, and Figure 15 is a similar view with the parts in the position taken after the joint has been made.

Referring now to Figures 1 to 5, a preferred form of my invention is shown wherein the tube T to be coupled is aligned with the externally threaded body B and has sleeved upon it an internally threaded nut N and carries the coupling element C at its free end adjacent the juxtaposed end of the body.

While the body B suggests the conventional form of straight pipe coupling it will be understood that my invention may, and is intended to be, practiced with T's, elbows, crosses, unions and/or the inlets or outlets of valves and other instrumentalities to which pipes, tubes or conduits are sought to be connected. As will more fully appear below my invention also has application beyond the field of pipe or tube fittings or couplings as, for example, where the coupling element may be employed to grip a valve stem for coaction with the packing or sealing elements thereof.

In Figure 1 the parts are shown in their pre-assembled relation with the forward, leftward as viewed, end of the coupling element contacting the end of the body and with the nut retracted rearwardly along the tube and the coupling element sleeved upon and encompassing the free, extreme forward end of the tube. In Figures 2 and 4 the several parts are shown in a preliminary assembled relation; the nut and body having threaded engagement without, however, beginning the forcible coaction between the parts whereby to effect the desired mechanical grip and fluid seal. In Figures 3 and 5 the parts are shown in their fully assembled, locked and joined relation with the end of the tube mechanically secured and substantially integrated within the coupling member and all the parts forcibly constrained to a fluid tight relationship.

Turning now more particularly to enlarged fragmentary views of Figures 4 and 5, it will more fully appear that the coupling element C in its preferred form comprises at its forward end an annular part 10, for convenience called the abutment, which engages the extreme end of the body B on its forward face in fluid tight contact, receives the extreme end of the tube in a rearwardly facing recess 11 and comprises the abutment for the integrally formed, rearwardly extending relatively thin annular bridge part 12 which in turn is integrally formed and joined with the annular ring part 13 from which the thin tail sleeve 14 of reduced external diameter and reduced thickness extends rearwardly. The ring part 13 comprises at its inner and forward portion or corner an annular cutting edge 15, which when the joint is made is moved and "rolled" longitudinally forwardly and radially inwardly as suggested in the dotted line 16 in Figure 4 from the position of Figure 4 to the position shown in Figure 5 wherein the edge 15 is imbedded in the wall of the tube as at 17. The rearward and outward side of the ring 13 is beveled at about 45° to truncated conical form, presenting a smooth conical surface 18 which is progressively engaged by a coacting female conical shoulder or surface 19 in the nut N. The pitch of the surface 19 is less, preferably about 30° to the axis of the coupling, than the pitch of the surface 18 so that initial working contact between these surfaces is made at the outermost edge and rearward corner of the ring 13 as at 20 whereby the force transmitted to the coupling element C from the nut N is first applied at the point 20 and presently is resolved in the direction of the arrow 21. Since the force exerted by the nut on the element C is developed through its threaded engagement with the body B the end surface 22 of the body reacts against the abutment 10 through the sealing surface 23 thereof with force equal and opposite the longitudinal force delivered by the nut to the element C. This force, in turn, is transmitted from the abutment 10 to the ring 13 through the bridge 12 as suggested by the arrow 24.

There is therefore developed between the bridge and the nut an annular couple imposed upon the ring 13 which initially imparts to it a rolling movement or tendency to rolling motion about a transverse center point or circle, suggested at 25, as indicated by the arrow 26, while at the same time the ring is moved or urged bodily forwardly and the cutting edge 15 is constricted to decreasing radial dimensions while also moving forwardly as along the dotted line 16 and turning up the annular clip or ridge R from the wall of the tube T, cf. Figures 4 and 5. The arrows 15a and 15b suggest the components of force delivered to the edge 15 to induce its desired movements. Passing for a moment the way in which these movements are induced, it is pointed out that the rolling of the ring probably proceeds about a succession of points 25a, b, c, etc., and in all events gives a mechanical advantage in favor of the nut wherein the longitudinal travel of the nut is materially greater than the movement of the cutting edge, as when the point 20 moves to the point 20a while the edge 15 moves to the point 17.

Consideration of these influences and results foreshadows the role of the bridge 12 in the operation of my invention. Briefly, the bridge affords yielding bending resistance to movement of ring 13 relative to the abutment 10 and tube T which induces the rolling action or tipping movement of the ring on the one hand and concurrently permits longitudinal forward movement of the ring on the other hand. In so doing the bridge itself is foreshortened, deflected inwardly toggle-wise and constricted and brought into gripping engagement with the tube, as shown in Figure 5, closely in front of, upon and confining the ridge R that the cutting edge turns up from the external part of the tube by its cutting action. The bridge also performs another service when it has been constrained to the position and condition suggested in Figure 5, namely, of abruptly stopping or retarding relative movement of the parts in the position shown in Figure 5 or so substantially increasing the wrench torque required to induce any further movement that the operator has ample notice that the joint has been perfected and completed. Additionally the bridge affords an independent annular fluid seal where it grips the tube, limits the depth of the cut made by the cutting edge 15, broadens the area over which radial tube constricting pressure is applied, tending to limit constriction of the tube while enhancing the grip with which the tube is held in the joint, and enhances the life of the joint in resistance to failure from vibration or other adverse influences that profit from concentration of the gripping forces in small areas and/or in a too-deep cut or in deeply necked tube.

Referring now more particularly to Figure 4, the bridge 12 is seen to have a greater length than thickness (preferably about 5 or 6 to 1) and comprises in substance a relatively thin-walled cylindrical annulus spacing and joining the ring 13 and the abutment 10. The bridge is disposed radially inwardly of the external periphery of the ring 13 and well radially inwardly of the contact point 20 thereof so that the line or zone of reaction of the bridge as suggested by the arrow 24 is well spaced inwardly from the line or zone of the force applied to the ring as suggested by the arrow 21, wherewith to develop the couple or the components of the couple that "roll" the ring according to the arrow 26 while advancing the same longitudinally and constricting it radially. This same disposition of the bridge causes it to buckle or "fail," not as a column naturally fails by bulging outwardly, but rather by inward buckling (at least in part) against the tube as shown in Figure 5. Thus when and as the nut bears on the edge of the shoulder of the ring at the point 20, that point is constrained to move forwardly and inwardly as to the point 20a, Figure 4 whilst the cutting edge 15 moves a lesser distance forwardly and a greater distance inwardly as to the point 17. Concurrently median points such as 27 on the lower middle surface of the bridge are induced to move as along the dotted line 28 to the point 29 where by virtue of the toggle-like action induced in the bridge a high radial reaction is developed by the mid-portion of the bridge against the tube T and the ridge R from relatively small components of longitudinal force imposed by the nut on the ring. Again mechanical advantage is given the nut, all to the end that high gripping and sealing forces and movements are developed with satisfactorily low wrench torque up to the point where the joint and seal is made and perfected. It will be appreciated that deflection of the bridge is initiated and much if not all its initial maximum resistance to bending overcome before the cutting edge 15 bites the tube, and thereafter while the work devoted to cutting the tube increases the work devoted to bending the bridge tends, roughly, to decrease up to the point where the bottoming of the bridge and the completion of the joint marks the sharp increase in gross resistance to further movement.

In this preferred form of my invention the cutting edge 15 is defined at the intersection of the bore 30 of the ring 13 and sleeve 14 with the radial undercut surface 31 which preferably lies normal to the axis of the bore, giving an annular 90° "cutting tool" which, as cutting proceeds, takes an anti-plowing angle with respect to the surface of the tube, as shown in Figure 5, whereby the ridge or chip R is not intended to be severed from the tube but rather integrated therewith and with the coupling element. The face 31 and edge 15 are disposed rearwardly of the rearward end of the bridge 12 per se, i. e., rearwardly of the outer forward face 32 of the ring 13 so that the body of the ring in effect overhangs the bridge, the better to induce its desired deflection of the bridge. The "fore and aft" location of the cutting edge in relation to the bridge measures the ratio of radial motion to longitudinal motion that is given the cutting edge in response to pressure from the nut to the shoulder of the ring, and also measures the tipping or rolling action of the cutting edge relative to its other motions. For example, if the cutting edge were located as far forwardly as the point 27 its tipping and longitudinal movements would be much reduced if not substantially eliminated and while a tendency to much radial movement would appear, the latter would be much inhibited by the reduction of the former and the lessened mechanical advantage between the shoulder 20 and the forwardly disposed edge. My present experience and teaching is that while the fore and aft location of the cutting edge may be modified appreciably from that shown herein as preferred, and with advantage under appropriate conditions, the preferred location now appears to me to be the best average position for the greater number of conditions of use.

The radial dimension of the undercut face 31 measures the depth and extent of the cut to be made in the tube, the size of the ridge R, and, where the lower surface of the bridge is cylindrical and coaxial with the whole coupling element C, as shown, also measures the amount and facility of deflection of the bridge and movement of the ring as a whole. That is to say, the height of the bridge, having regard also for its length and thickness, is a determinable variable in the construction of my coupling element which I can increase to effect deeper cuts as for thick wall tubing and can conversely reduce to limit the depth and extent of the cut where thin wall tubing is to be gripped.

With a bridge of a given height and thickness the length of the bridge is also a measure of the total travel of the ring 13 and the cutting edge 15 as well as the resistance to bending that the bridge affords. Similarly the thickness of the bridge contributes to its resistance to bending and influences the character of the whole movement of the ring 13. Generally speaking the length and thickness of the bridge influences its operation in much the same way that the relation of length to thickness influences deflections of beams similarly loaded.

Employing coupling elements with the parts proportioned substantially as shown in the drawings and described below, I have observed that while the bridge is being deflected, as discussed above, that it is also thickened and foreshortened as perhaps not entirely apparent from Fig. 5 as such; the thickening admitting an increment of desirable longitudinal movement of the ring and cutting edge and contributing with the inward deflection to the radial grip that the buckled bridge exerts upon the tube. I have also observed that occasionally a bridge tends to fracture at or about the time and place of its maximum internal stress and deflection or shear, but such fracturing as I have observed does not impair the operation of the device since all the elements are bearing upon each other in self-sealing relation and tightening of a deflected and fractured bridge merely continues its intended function and tends to coldweld the fractured surfaces together. While I do not necessarily recommend that the bridge in this form of my invention be so proportioned or hardened or otherwise treated as to induce fracture, still it is one of the facilities of my invention that its operation is not substantially impaired by a fracture of the bridge or at least any such fractures as I have observed over an extended series of tests and experiences.

As mentioned above, the nut N first makes contact with the outer periphery of the ring 13 at the point 20 and initiates the rolling and forward movement of the ring as discussed above. As these combined movements of the ring proceed the conical surface 18 of the ring is inclined to parallelism with and full engagement with the conical shoulder 19 of the nut at a time preceding somewhat the condition illustrated in Figure 5. When the surfaces 18 and 19 are fully engaged the rolling action of the ring is largely eliminated as such and the deflection of the bridge 12 is largely accomplished as such, but the bottoming condition of Figure 5 is not necessarily reached since the force from the nut while transmitted to the ring 13 through the conical surfaces 18 and 19 still exerts a longitudinal component of force and movement on the ring as well as a radial component, all of which augments and continues the original movements but more positively confines, advances and constricts the ring and more fully deflects and foreshortens the bridge toward and to the "home" position shown in Figure 5. In this position it will be seen from Figure 5 that the ultimate thrust from the nut normal to the surface 19 is aimed at the cut in the tube, the ridge R and the bottomed bridge, wherewith to tend to compact the whole mass and integrate the coupling element with the tube throughout a zone extending before and behind the cut and the ridge.

While these primary gripping and sealing actions are taking place, I also provide that the sleeve 14 and preferably the rearward end thereof also be brought into snug forcible contact with the wall of the tube to extend the total area an overall length of grip between the coupling element and the tube and to dampen or militate against injury from vibration and the deleterious incidents thereof on the coupling and the joint. To this end, I provide an exterior conical chamfer or bevel 35 on the rearward end of the sleeve 14 defining a cone preferably at a pitch of about 40° to the axis of the coupling member and also provide an internal conical shoulder or surface 36 internally of the end of the nut N and juxtaposed to the surface 35 and pitched at a slightly steeper angle as at about 45° to the axis of the nut. I also provide that the length of the sleeve and the length of the nut be such that the surfaces 35 and 36 will not make contact until after the larger internal shoulder 19 of the nut engages the ring at the point 20 and has induced a substantial movement of the ring. The initial roll and movement of the ring tends to bulge the sleeve 14 outwardly behind the ring 13, and I prefer that this initial movement of the sleeve be unimpaired and thereafter as the further movements of the ring proceed and the cutting edge contacts or bites the tube that the surface 36 engage the surface 35 wherewith to constrict the rearward end of the sleeve without negativing its bulging tendency adjacent the ring. After the surfaces 35 and 36 make contact and contribute to the bulging of the sleeve on the one hand and the constriction of the rearward end thereof on the other, the longitudinal forward motion of the coupling element as a whole is promoted through the sleeve as well as through the ring. When the joint is completed the sleeve 14 will in its preferred form be in a bulged and stressed state with its extreme rearward end wedged between the tube and the rearward bore of the nut, thereby tending to "lock" the nut against inadvertent rotation or loosening.

As has been mentioned above the abutment 10 is, during the joining and sealing operations, forcibly urged into fluid tight contact with the face 22 of the body B. The pressure with which the abutment is forced into contact with the body is ordinarily such as to provide an adequate fluid seal when the coacting surfaces 22 and 23 are substantially flat and planar and are both normal to the axis of the coupling, as is desired to furnish a "close" coupling. As will be discussed below the coupling member preferably has a hardness greater than that of the tube and often greater than the material of the body B with the result that ordinary annular tool marks on the face 23 of the abutment tend to penetrate, at least microscopically, the softer surface of the face 22 of the body and enhance the fluid seal therebetween. Similarly I have found it of advantage to knurl or emboss a self-contained shallow pattern, preferably lacking radial continuity but with radial components, on the face 23 of the abutment which will tend to embed itself in the face 22 of the body and enhance the seal and also tend to prevent rotary movement of the abutment relative to the body when contact between the nut and the ring tends to rotate the coupling element and the tube if the former has gripped or contacted the latter. I prefer, however, especially in the larger sizes and with harder materials, to form a small annular, substantially V-shaped, cutting edge 40 with its apex facing forwardly so that it will positively cut or penetrate the surface 22 and/or be flattened somewhat thereagainst as suggested at 40a in Figure 5 and in all events provide an annular area of high unit pressure and effect a positive seal without substantially reducing the closeness of the coupling. I prefer that the edge 40 actually cut into the face 22 of the body, even if but slightly wherewith to anchor the abutment against its own tendency to expand radially as well as facilitate the seating and "centering" of the abutment relative to the threads of the body rather than the axis thereof if the same are not coincidental.

The recess 11 in the inward and rearward portion of the abutment has a bore 41 preferably coaxial with the bore 39 and has an inclined rearwardly facing conical shoulder or surface 42 against which the extreme end of the tube abuts. The cone defining the surface 42 is preferably rather flat but tends to flare the extreme end of the tube outwardly somewhat, bringing the outer surface of the tube into contact with the bore 41 as the tube is moved or urged slightly forwardly under the influence of the cutting edge. That is to say, while the ring and bridge are carrying out the operations described above and the tube is urged forwardly or leftwardly, as viewed in the drawings, and is constricted slightly under the bridge and under the cutting edge it tends to flare outwardly at its extreme end and I prefer to limit and take advantage of this tendency wherewith to effect a snug contact between the end of the tube and the recess 11 and especially the bore 41 thereof. I have found the provision of the recess 11 and the conical surface 42 to be of increasing advantage with thin walled tubing especially of larger diameter as distinguished from relatively thick walled or small diameter tubes which are more resistant to inward swaging or constriction at the extreme end when the joint is made.

As suggested in the drawings and from the instant specification, the abutment 10 is an annulus of such relative mass and strength as compared particularly with the bridge 12 as to be substantially unyielding in contrast with the yielding qualities desired in the bridge. That is to say, the abutment part 10 functions as an abutment for a bridge, anchoring the forward end thereof against substantial longitudinal or radial movement and preferably being of such relative mass and strength as to resist bodily expansion or contraction under the influence of the forces imposed upon it. While in this preferred form of my invention I have shown the sealing face 23 of the abutment normal to the axis of the coupling and parallel with the square ended body with its face 22, I do not intend to teach the exclusion of making both the faces 22 and 23 more or less conical or spherical or of other complementary form, nor do I suggest it is impracticable that the faces 22 and 23 or their equivalents take forms not necessarily complementary to one another so long as these surfaces by their coaction effect a desirable fluid seal and a mechanical relation one to the other not inconsistent with the desired operation and practice of my invention, see for example Figure 7. While I prefer as will more fully appear that the abutment and/or the anchored end of the bridge lie exteriorly of the body so that the coupling may have the attribute of "closeness" in many forms, I do not exclude from my teaching that the body may be recessed to receive all or part of the abutment and/or the forward end of the bridge and the extreme end of the tube in instances where my invention may be practiced to advantage in that form.

The material of which the coupling element may be made admits of a considerable choice depending in part upon the material of the tube to be coupled as well as the materials that are desired to be employed in the nut and body. Using aluminum parts, for example, the coupling element can be made of Duralumin or other aluminum alloy having the property of greater hardness than the tube to be coupled to facilitate the cutting action of the edge 15 into the tube, and preferably harder than the body to aid the seating of the abutment and/or the edge 40 into or against the body. When copper tubes with brass or steel bodies are employed, I prefer to use a coupling element of steel which is naturally harder than the tube. On steel tubes I prefer to use a steel coupling element of similar hardness but of free machinability, which after being machined and formed is given a light case hardening as by cyaniding and carbonitriding to have a case preferably of as little as one to two thousandths inches deep. The light case hardness has been found ample for the cutting and sealing operations and does not deleteriously impair the yielding properties of the bridge and the sleeve or the rolling of the ring with respect to the other parts of the element. Dealing with stainless steel tubing, I find it practicable to use free machining steel for the material of the coupling element and then harden the cutting edge more deeply and to a greater degree of hardness than otherwise desirable while largely avoiding hardening of the bridge and more or less the rest of the cutting element by means known to those skilled in the art which, for example, may comprise copper plating the whole element lightly and then scuffing off the plating adjacent the cutting edges 15 and 40 before submitting the element to a case hardening treatment whereby to confine the hardening substantially to the cutting edge or edges. While I mention this manner of localized hardening with especial reference to stainless steel tubing, I, of course, do not confine myself in this example of hardening to that or any other specific use but leave it to the judgment and choice of the user to harden generally or specifically as occasion may require within the broad precepts and teachings of my invention.

To facilitate understanding and practice of my invention an example of size and proportion of the coupling element of my invention is stated by way of further illustration and exemplification, as follows:

For ½" O. D. tube the bores 14 and 41 exceed ½" only by enough to take care of variations in commercial tolerance of the tube and coupling element to afford a free sliding fit. The inner bore of the abutment corresponds approximately to the I. D. of the tube and the O. D. of the abutment and ring is about .680". The abutment 10 is about .07" to .08" long and the length of the bridge on the outer surface is about .109" long, and, as measured between the abutment and the face 31 adjacent the cutting edge, is about .125" long. The radial depth of the surface 31, i. e. the height of the bridge above the bore is about .03", the thickness of the bridge about .0185" to .02" and the depth of the groove above the bridge between the outer parts of the ring and the abutment about .0385". The outer cylindrical surface of the ring is about .031" long and the sleeve 14 preferably extends about .25" rearwardly from the ring and is about .025" thick. While the drawing in Figure 4 is not necessarily exactly at scale, I have undertaken to make it correspond substantially to the dimensions and proportions here given. For tubes of greater and smaller size my experience has been that all the dimensions above stated should not be or should not necessarily be modified proportionately for the best practice of my invention. For example in making a coupling element for a one inch tube the bores and the external diameters of the ring and abutment might well be approximately doubled in respect to the ½" size and the overall length might be moderately increased as in the abutment, ring and sleeve, but the length and thickness of the bridge and its spacing from the tube may well be kept the same as in the ½" size although the mean diameter of the bridge would have to be approximately doubled as compared with the ½" size.

I have found it practicable and economical to employ the modified form of my invention illustrated in Figure 6 which corresponds to my preferred form excepting that the coupling element C' has the inward portion of the abutment interiorly of the inner cylindrical surface of the bridge eliminated, thereby also eliminating the operation of undercutting under the bridge and permitting the interior surfaces of the coupling element to be machined by the main bore 30 and a counterbore 45 down to the surface 31. The operation of the modified form of my invention is substantially the same as that described with respect to the preferred form, it being appreciated that the extreme end of the tube bears directly on the end surface of the body and is restrained from longitudinal movement thereby whilst the seal between the abutment and the end of the body is established in the same way as that above described and the other functions of the several elements and parts proceed in substantially the same way as that above described. In this form the anchoring of the abutment by the edge 40 cutting the face of the body is the more preferred to facilitate anchoring and locating the abutment.

I may also mention as a further modification that the sleeve element 14 may be eliminated from either of the forms of my invention discussed above without substantially diminishing the utility thereof for purposes wherein the hazards of vibration and other peculiar conditions of service are not to be encountered in critical degree, and similarly the sleeve may be added to the forms hereinafter described that lack the same for the use and advantages thereof.

In Figure 7 I have undertaken to suggest how it is practicable to use my coupling with a standard body B' having the characteristic truncated conical end surface 46 against which the inner forward corner or edge 47 of the abutment part of the coupling element C' may abut, and, as a practical matter, cut itself a fluid tight seat and seal when the parts are assembled together in the manner above described. In this form I prefer that the corner 47 be harder than the body and if used be given extra hardness to cut a self-sealing fluid tight seat in the body when the joint is made.

In Figures 8 and 9 there is shown a further modified form of my invention wherein the coupling element K is employed with the same body B, a modified form of nut N' which differs from the nut N in that it requires no rearward extension but embraces the shoulder 19 above described more nearly the rearward end thereof. The tube T to be coupled corresponds to the tube T previously discussed and is intended to be gripped and sealed within and by the coupling element K for the same or substantially the same purposes.

The coupling element K as a whole follows the element C' in its general and overal proportions and operations but is of two-piece construction comprising an outer and forward part 50 which includes an abutment 51 at the forward end corresponding to the abutment part above described, a bridge 52 corresponding to the bridge 12 above described and a ring part 53 having the rearward conical surface and shoulder 18 and corresponding to the ring 13 above described, but which specifically lacks as an integral part thereof the cutting edge and tail sleeve per se.

The second piece or part of the coupling element K comprises a sleeve-like element 55 which provides at its forward, inner corner a cutting edge 56 and has at its forward end a shallow, radial flange or collar 57, the exterior diameter of which equals the interior diameter of the abutment and bridge but which has a greater exterior diameter than the minimum bore 58 of the ring part 53 by virtue of which the part 55 may be inserted into the part 50 from front to rear, i. e. from left to right as viewed in the drawings, and thereafter the part 50 is held against leftward movement relative to the part 55. The external diameter of the part 55 substantially corresponds to the diameter of the bore 58 and preferably has a snug fit therewith. The part 55 may comprise a complete annulus secured in the part 50 by pressed fit, but I prefer that the part 55 comprise a split annulus which at least in the idle position indicated in Figures 8 and 9 has its circumferential ends spaced to leave a gap as shown at 59 in Figure 9. My preference also is that the sleeve part 55 substantially correspond in principle to the cutting ring element more fully described and claimed in my U. S. Patent No. 2,474,178, issued June 21, 1949, although my present invention permits the advantageous employment of a sleeve 55 with the gap 59 either greater, substantially the same as or less than the gap described in my prior patent because the buckling and deflection of the bridge 52, as shown in Figure 5 and described above in relation thereto is capable of affecting an independent fluid seal. Therefore, if the sleeve 55 when constricted at its forward end has not entirely closed the gap 59 adjacent the cutting edge 56, still the coupling of this form of my present invention will be fluid tight by virtue of the seal effected by the bridge 52 and will be mechanically secured by the action of the cutting edge 56 corresponding to the action of the cutting edge 15 as described with especial reference to Figures 4 and 5 above. As taught in my prior patent, I prefer that the circumferential length of the sleeve 55 be less than the circumference of the exterior of the tube T so that the gap will never be closed substantially rearwardly of the cutting edge with the result that the sleeve throughout its whole length will embrace and hug the tube snugly with maximum grip and snugness adjacent the cutting edge.

In this modified form of my invention I also prefer that the sleeve 55 have its forward end and cutting edge in a plane truly normal to its axis but that its rearward end be bevelled more or less as suggested at 60 for such enhancement of its vibration dampening qualities as such bevelling may contribute.

That the coupling K is made of the two pieces 50 and 55 is especially advantageous in that the part 50 may be made of relatively soft ductile material so that it may have especially in the bridge part thereof the most desirable quality of deformability to facilitate its inward buckling and gripping of the tube and confining the ridge on the one hand and that the part 55 may be separately hardened and given the qualities most sought in the use of its hard cutting edge 56. The part 55 when made in the split form can also have an expanding resilience wherewith to keep it snugly in the desired relationship and engagement with the part 50 preliminary to its ultimate use. The two-piece construction also lends itself to economy of manufacture in that the part 50 may be a simple screw machined product requiring no undercutting and when the part 55 is made in the split form it may be rolled from relatively light sheet stock and thereafter tempered and hardened prior to assembly with the part 50.

In Figure 10 there is disclosed a further modification of my invention in the environment of a flanged joint which incidentally illustrates the utility of my invention, in all forms, in such an environment. Here a valve body V having a conventional flange F adjacent a port is intended to be coupled with the tube T. The flange F may have a flat sealing face 65 corresponding to the face 22 of the body B above described against which the abutment part 10a of the coupling element E will have sealing contact through its forward face 66; the abutment part 10a corresponding to and operating like the abutment 10 of the element C above described. The element E also has a bridge portion 12a corresponding to the bridge 12 above described and has a ring part 67 corresponding to the ring part 13 with this difference in this modified form, however, that the rearward and outward conical surface 18a and the inward portion of the ring with its cutting edge 68 is embraced in a separate annular piece 70 that may be separately hardened and proportioned to have a pressed fit with that portion of the ring part that is formed integrally with the bridge. In this form, as in the next preceding form, the abutment, bridge and integrally connected part of the ring may be made by simple screw machine operations and be made from free machining material having the properties of yieldability that is desirable in the bridge whilst the part 70 may be formed of material which will have the facility of being readily hardened and can be separately hardened and thereafter pressed into tight engagement as shown in Figure 10. The part 70 will coact substantially as if integral with the other parts of the element E in substantially the same way as described with especial reference to Figures 4 and 5 above; the part 70 having an outward and rearward conical surface 18a corresponding to the surface 18, an outward and rearward shoulder 20a corresponding to the shoulder 20 both for coaction with the conical shoulder 19a corresponding to the surface 19 but formed in the flange ring 71 which is drawn toward the flange F through an appropriate number of bolts 72 with nuts 73 to advance the ring 71 with substantially the same results that follow from the advancement of the nuts N and N' previously described.

In Figure 11 there is illustrated a practice of my invention in the form of a straight union wherein coupling elements J, each substantially corresponding to the elements C or E abut each other in sealing contact and each separately grips the respective tubes T and T' in the manner above described when the coacting threaded members 75 and 76 are drawn together. In this form each of the members 75 and 76 substantially corresponds to the nut N in respect to the coaction with the respective coupling elements.

In Figures 12 to 15 another modified form of my invention with variants is disclosed. In this form the abutment part of the coupling element is, per se, eliminated and the forward end of the bridge is "anchored" directly to the body so that the body serves as the abutment for the bridge. The operations and results of gripping and sealing the tube with the bridge and ring parts are substantially the same as those described above. In the embodiment of Figures 12 and 13 the body B" corresponds to the body B above described except that its rearward face 77, otherwise corresponding to the face 22 of the body B, is recessed slightly as at 78 to have a shallow annular cylindrical shoulder 79 and a low pitched conical surface 80; the latter substantially corresponding to the surface 42 of the recess 11, except in radial dimension, and the former having a diameter corresponding to the O. D. of the bridge 81 of the coupling element K whereby to receive the extreme end thereof snugly and restrain it from outward radial movement. The extreme forward end of the bridge 81 bears longitudinally against the conical surface 80 and is tended to be urged radially outwardly thereby when pressed forwardly and is then forced into an anchored and fluid tight engagement with the conical and cylindrical surfaces which form the radially outward annular corner of the recess 78 as shown in Figure 12, and more particularly in Figure 13.

In this form of my invention the bridge 81 is preferably a little longer and a little thicker than described as preferred above in the other forms of my invention, but is spaced about the same distance from the surface of the tube T and deflects and grips the ridge R and the tube in substantially the same way as described above when the nut N" is advanced toward the body and rolls and advances the ring part 82 of the coupling element K, cf. Figures 12 and 13. The increased length of the bridge in this form positions the cutting edge 83 a little further to the rear of the extreme end of the tube so that the whole constricting grip on the tube will be spaced far enough from the extreme end to avoid any deleterious tendency to swag and turn in the extreme end adjacent the body. I prefer that the length of the bridge, however, be so limited that no substantial forward portion thereof buckle outwardly as in column failure to an extent that deleteriously impairs a desirable inward deflection of the rearward part of the bridge adjacent the ring part of the coupling member. For like reasons the bearing of the extreme end of the tube on the outwardly flaring conical surface 80 tends to offset the tendency of the extreme end to turn inwardly and may with advantage tend to flare it outwardly a little as suggested in Figure 13.

The ring portion 82 with its cutting edge 83 substantially corresponds to the ring portions above described and may have an integral or separable tail sleeve (not shown) as described in one or another of the forms above, and in all events coacts with the nut and influences the bridge and cutting edge in the same or substantially the same way as described above in the characteristic of my invention, see Figure 13.

This form of my invention admits of the least machine work in forming the coupling member and provides a substantially close coupling; the shoulder 79 not necessarily exceeding 1/64″ to 1/32″ in depth for a satisfactory anchorage for the bridge for most moderately sized couplings.

The variant of this form shown in Figures 14 and 15 may be taken as substantially identical with that shown in Figures 12 and 13 with the exception that the forward end of the bridge 84 of the coupling element K′ has a sharpened edge 85 capable of cutting or indenting the face 22 of the body B as at 86 in Figure 15, whereby the forward end of the bridge is self-anchoring while and when the joint is being made. The edges 85 and 83 are preferably made harder than the body and tube respectively, and preferably this form of my invention is employed with bodies B of relatively soft material compared with the edge 85 to facilitate the self-anchoring of the bridge and its restraint from substantial and/or deleterious radial expansion or movement while the joint is being made. The hardening of the edge 85 and the stock adjacent thereto also advantageously increases the strength thereof and inhibits splaying or undesirable deformation or other impairment of the desired anchoring relationship between the forward end of the bridge and the body. The cutting or indenting of the face 22 of the body by the edge 85 also effects or enhances a tight fluid seal between the end of the bridge and the body and provides a limited fulcrum effect with respect to which desirable deflection of the mid-portion of the bridge is facilitated.

While I have illustrated and described a preferred and certain modified form and embodiment of my invention, changes, modifications and improvements will suggest themselves from the within description and will appear to those skilled in the art who come to practice and understanding my invention and the principles and advantages thereof and, therefore, I do not care to be limited in the scope and effect of my patent to the specific forms and embodiments herein particularly illustrated and described to illustrate my invention nor in any manner inconsistent with the advance which my invention marks with respect to the state of the prior art.

I claim:

1. In a tube coupling the combination of a member having a substantially square end facing the tube to be coupled, a second member having an internal substantially conical shoulder facing the said end of the first member, means to move said members to forcibly move said shoulder toward said end, and a coupling element adapted to encompass the tube to be coupled and disposed between the said end face and said shoulder, said coupling element having an abutment part engageable with the end of said first member and having a ring part with a rearward and outward annular corner bounding a substantially conical surface of steeper pitch than said shoulder and progressively engageable with said shoulder, the ring part having a cutting edge at an inner and forward corner adapted to be constricted and advanced into the external surface of the tube to bite therein and turn up a ridge or chip from the exterior of the tube, said coupling element also comprising an integral deformable yielding cylindrical thin walled bridge part between the said abutment and ring parts and spacing said parts and having a greater internal diameter than said cutting edge and a lesser external diameter than said corner and being held by said abutment part against movement adjacent thereto and yieldably admitting the ring part to be rolled and constricted and moved toward the abutment part under the forcible influence of said shoulder upon said corner, said yielding bridge part being itself forced inwardly into snug contact with the wall of the tube in front of said cutting edge and confining the ridge or chip turned up by said cutting edge, said abutment part having a cutting edge biting into the end face of said first member and a rearwardly facing recess with an outwardly flaring surface to receive the extreme end of the tube to be coupled.

2. In a tube coupling for joining a tube to a body at the rearward end of the body with a coupling element encompassing the tube near said body and engaging the body and with a member coacting with said body and having a female seat engaging said element and constraining said element to have forcible engagement with the tube and said body, the improvement wherein said element comprises a rearwardly disposed ring part having a rearward shoulder of steeper pitch than the said seat of said member and with an outer corner remote from the tube that is first engaged by said seat of said member, said ring part also having a forwardly facing cutting edge adjacent the tube and longitudinally adjacent said corner and adapted to bite into the surface of the tube and turn up a ridge from the wall thereof when said ring part is forcibly engaged and moved by said member, said element also having an annular resistantly yieldable part disposed between said body and said ring part and engaging said ring part radially outwardly of said edge and radially inwardly of said corner and secured against movement adjacent said body and yieldably resisting movement of said ring part toward said body under the influence of said member and operatively reacting against said ring part radially between said corner and said edge whereby to induce a forward rolling movement of said ring part and a forward and inward motion of said edge, said element also comprising an annular substantially unyielding abutment at the forward end of said yieldable part, said abutment engaging said face of said body on its forward side and having an inwardly extending outwardly flaring surface against which the extreme end of the tube abuts and tends to be flared outwardly.

3. A tube cutting and gripping element for a "tube" coupling comprising a short and thick ring portion with a substantially cylindrical bore receptive of the tube to be coupled and with a forwardly facing inner substantially radially disposed face intersecting the forward end of the bore and forming a tube cutting edge therewith at the inner forward corner of the ring portion, said ring portion having a radially inward part longitudinally aligned with said edge and having a radially outward part which parts comprise the thickness of the ring; the length of the bore of the ring portion not substantially exceeding the thickness of the ring portion, said outward part of the ring overhanging the said inner forward face and the said edge and having an inwardly facing substantially cylindrical face angularly related to said substantially radial inner face and radially spaced from said edge, said outward part of the ring having a rearwardly and outwardly disposed shoulder approximately aligned with said edge radially, said ring portion having a substantially frusto-conical rearwardly facing surface inwardly and rearwardly of said shoulder, said element also comprising a second forwardly disposed portion flexible in relation to said ring portion comprising a rearwardly disposed substantially tubular part joined to and extending forwardly from the said outward part of said ring portion coaxially of said bore, said tubular part being relatively long and thin walled in comparison with said ring portion and having initial strength in resistance to axial compression and weakness in resistance to buckling adjacent said ring portion with and upon inward deflection of the said overhanging outward part of said ring portion, and said tubular part having decreasing resistance to axial compression as said tubular part is buckled whereby to admit forcible axial foreshortening of the whole of said element when accompanied by constriction of said cutting edge.

4. A tube cutting and gripping element for use with a tube coupling comprising a body having a bore and a rearwardly facing external radial abutting face and a coupling member secured thereto and encircling a tube to be connected to said body for movement toward said body and having a forwardly and outwardly flaring inclined camming shoulder, said element comprising a substantially inflexible ring portion having a bore encircling the tube and adapted to lie between said radial face on the body and said shoulder on the coupling member, said ring portion having an inclined surface thereon of a greater angle than the inclined camming shoulder on the coupling member for engagement thereby when the coupling member is moved axially of the body, said ring portion having an inner radial face opposed to the radial face on the body and forming with the bore therein an inner cutting edge having a cutting angle not substantially exceeding a right angle and having a radially outwardly disposed portion spaced longitudinally of the inner radial face toward said body, and said element also comprising a relatively long thin walled flexible tubular portion surrounding the tube and extending forwardly from said ring portion and adapted to have its forward end held immovable with respect to the body, said tubular portion being spaced from the tube and lying radially between the inner radial face and the outer radial portion of said ring portion, the angularity of the inclined surfaces on the coupling member and element being such that upon axial movement of the coupling member toward the body the inclined surfaces initially engage at the outer margin of the ring portion to cause canting of the cutting edge into engagement with the tube and buckling and weakening of the tubular portion whereby further movement of the coupling member causes axial collapse of said tubular portion and longitudinal movement of the cutting edge.

5. A tube cutting and gripping element for a tube coupling adapted to be worked between a body and nut, comprising a relatively immovable forward end part adapted to engage the body and be held substantially immovably to work the element, an axially movable rearwardly disposed substantially inflexible edge carrying ring part spaced from and movable forwardly relative to said forward end part, and a relatively flexible axially yielding part joining and yieldably spacing said ring part from said end part, said ring part having a bore and an inner forwardly disposed substantially radial face intersecting the bore at the forward end thereof and forming an annular cutting edge adapted to lie closely adjacent the tube and having a cutting angle not substantially greater than a right angle, said ring part having its length substantially equal to its thickness and having an outermost external annular surface at the place of greatest thickness of the ring radially overlying said edge and having an outer and rearwardly inclined surface engageable with the nut for moving said ring part, said flexible part comprising a thin walled elongated straight cylindrical portion disposed coaxially of said bore and of greater internal diameter than said bore and of lesser external diameter than said external annular surface of the ring part and having a wall thickness not substantially greater than ⅓ the thickness of said ring part.

6. The combination of a tube having an annular groove with a tapered rearward surface and an abrupt forward face spaced from the forward end of the tube and having a ridge turned up from the groove forwardly adjacent thereto and spaced from the forward end of the tube with an abrupt rearward face common to the said forward face of the groove, and a worked and stressed coupling element encircling the tube and fixedly attached thereto in stressed engagement with the tube at and adiacent said groove and ridge, the rearward end of said element comprising a short and thick substantially unyielding constricted and stressed annular ring part having an outward and rearward inclined surface engageable by a tube coupling member and having an inwardly and forwardly tapered bore forcibly engaging said rearward tapered surface of said groove and stressing said tube in compression within said bore and having a substantially radially disposed inner forward face defining an edge at the forward end of said bore and forcibly engaging the forward face of said groove and the rearward face of said ridge, said edge being embedded in said groove in the tube radially inwardly of a mid-portion of said outward and rearward inclined surface of said ring part, said element also having an inwardly facing annular surface adjacent said forward face forcibly confining the rearward part of said ridge, said element also comprising an annular part relatively thin-walled compared with said ring part and integrally formed with said ring part and extending forwardly therefrom with an annular rearward portion buckled inwardly upon the tube and in tight engagement therewith adjacent the forward side of said ridge and with an adjoining more forwardly disposed portion curving forwardly and outwardly away from the tube and spaced therefrom.

7. The combination of claim 6 with means at the said foremost end of said element for effecting fluid tight substantially non-expansible engagement with a coupling body.

8. The combination in a close tube coupling of a body to the rearward end of which the forward end of a tube is coupled externally of said body; the tube having an annular groove with a tapered rearward surface and an abrupt forward face spaced from the extreme forward end of the tube, and the tube having an annular ridge of appreciable size adjacent the forward face of the groove, an abutment associated with said body engaging the extreme forward end of the tube, a coupling member having a bore for the tube and forcibly coacting with said body, and a deformed coupling element forcibly gripped between said member and body and mechanically gripping the tube and having a fluid tight engagement with the tube and with said body, said body having a substantially non-reentrant rearward surface facing and engaging the forward end of said element, said member having a conical forwardly facing surface engaging the rearward end of said element, the rearward end of said element comprising a thickened ring-like part having an outward and rearward conical surface engaged by said member and having an inwardly and forwardly tapered bore forcibly engaging said rearward tapered surface of said groove and stressing said tube in radial compression within said bore and having a substantially radially disposed inner forward face defining a cutting edge at the forward end of said bore and forcibly engaging the forward face of said groove and the rearward side of said ridge and stressing said tube in axial compression against said abutment, and having an outer part overhanging said face, said cutting edge being embedded in said groove in the tube radially inward and substantially under a portion of said conical surface of said member, said element also comprising a flexible tubular part integrally formed with said ring-like part and extending forwardly therefrom from above said inner face and having an annular rearward portion buckled inwardly upon said ridge adjacent said face and in tight engagement with said ridge on the forward side thereof and stressing said ridge in compression, said element being stressed in compression axially between said member and said body and stressed in compression radially between said member and said tube.

9. The combination in a tube coupling of a body to the rearward end of which the forward end of a tube is coupled externally of said body; the tube having an annular groove with a tapered rearward surface and an abrupt forward face spaced from the extreme forward end of the tube, and the tube having an annular ridge of appreciable size turned up from the stock of the groove adjacent the forward face of the groove, a coupling member having a bore for the tube and forcibly coacting with said body, and a deformed coupling element forcibly gripped between said member and body and mechanically gripping the tube and having a fluid tight engagement with the tube and with said body, said body having a rearward surface facing and engaging the forward end of said element, said member having a forwardly and outwardly inclined camming shoulder engaging the rearward end of said element, the rearward end of said element comprising a thickened substantially inflexible ring-like part having an outward and rearward forwardly inclined surface engaged by said camming shoulder and having an inwardly and forwardly tapered bore forcibly engaging said rearward tapered surface of said groove and stressing said tube in radial compression within said bore and having a substantially radially disposed inner forward face defining a cutting edge at the forward end of said bore and forcibly engaging the forward face of said groove and the rearward side of said ridge and stressing said tube in axial compression relative to the rearward end of said body, said cutting edge being embedded in said groove in the tube radially inward and substantially under a portion of said camming shoulder, said element also comprising an annular inwardly constricted portion adjacent said inner face forcibly compressing said ridge, said element also comprising a deformed and stressed flexible part extending forwardly from said last named portion of said element and having an annular rearward portion buckled inwardly upon the tube adjacent said ridge externally of said body.

10. The combination in a tube coupling of a body to the rearward end of which the forward end of a tube is coupled with said body; the tube having an annular groove with a tapered rearward surface and an abrupt forward face spaced from the extreme forward end of the tube, a coupling member having a bore for the tube and forcibly coacting with said body, and a deformed coupling element forcibly gripped between said member and body and gripping the tube and having a fluid tight engagement with the tube and with said body, said member having a forwardly and outwardly inclined camming shoulder engaging the rearward end of said element, the rearward end of said element comprising a short thick substantially inflexible ring-like part having an outward and rearward inclined surface engaged by and constricted by said member and having an inwardly and forwardly tapered bore forcibly engaging said rearward tapered surface of said groove and stressing said tube in radial compression within said bore and having a substantially radially disposed inner forward face defining an edge at the forward end of said bore and forcibly engaging the forward face of said groove and stressing said tube in axial compression toward said body, said edge being embedded in said groove in the tube radially inward and substantially under said camming shoulder, said element also comprising a flexible thin walled tubular part integrally formed with said ring-like part and extending forwardly therefrom from above said inner face and having an annular portion buckled inwardly toward the tube forwardly of said groove and rearwardly of the rearward end of the said body.

11. The combination of claim 10 in which said element also comprises a forwardly disposed thickened substantially inflexible annular anchoring part in fluid tight engagement with the rearward end of said body and integrally joined to the forward portion of said tubular part.

12. A close tube coupling, comprising in combination a body with a substantially flush rearward end to which a tube is to be coupled and held in fluid tight and mechanically strong engagement, an abutment for the end of the tube associated with said body externally of the body, radially thick and axially short ring means having a cylindrical bore encircling the tube and having an inwardly and forwardly disposed substantially radial face forming with the bore a cutting edge harder than the tube and spaced axially from said abutment and adapted to be forcibly constricted into cutting engagement with the tube and advanced axially forward toward said abutment and relative to the tube and cut a groove in and turn up a ridge of appreciable size from the exterior of the tube, and said ring means having an outwardly and rearwardly disposed substantially annular inclined bearing surface with at least a foremost portion located axially near and radially remote said cutting edge, means for controlling the motion of said cutting edge and being disposed between said abutment and said ring means and encircling the tube and yieldably resisting motion of said edge toward said abutment and having a forward end substantially axially immovably associated with said abutment and a rearward end integrally joining said ring means with radial clearance from said cutting edge, and said last named means having a portion axially long and radially thin compared with said ring means and having resistance to axial compression in the absence of radial deflection and having diminished resistance to axial compression after radial deflection, and means having a camming shoulder pitched less steeply than said inclined bearing surface for imposing axially forward and radially inward forces on said ring means to constrict said edge and deflect said portion and foreshorten said portion and advance said edge whereby to cut a groove of appreciable length and depth in said tube and turn up a ridge of appreciable size.

13. A close tube coupling, comprising in combination a body with a substantially flush rearward end in relation to which the tube is to be held immovably and coupled externally, radially thick, axially short and axially substantially inflexible ring means having a substantially cylindrical bore encircling the tube and having an inwardly and forwardly disposed substantially radial face forming with the bore a cutting edge harder than the tube and with a cutting angle not substantially exceeding a right angle and spaced axially from said body and adapted to be forcibly constricted into cutting engagement with the tube and advanced axially forward toward said body and relative to the tube and cut a groove in and turn up a ridge of appreciable size from the exterior of the tube, and said ring means having an outwardly and rearwardly disposed inclined bearing surface with at least a foremost portion located axially near and radially remote said cutting edge, means for controlling the motion of said cutting edge and being disposed between said body and said ring means and encircling the tube and yieldably resisting motion of said edge toward said body and having a forward end substantially axially immovably associated with said body and a rearward end integrally joining said ring means with radial clearance from said cutting edge, and said last named means having an axially flexible portion proportioned axially long and radially thin compared with said ring means and having resistance to axial compression in the absence of radial deflection and having diminished resistance to axial compression after radial deflection, and means having a camming shoulder pitched less steeply than said inclined bearing surface for imposing axially forward and radially inward forces on said ring means to constrict said edge and deflect said portion and foreshorten said portion and advance said edge whereby to cut a groove of appreciable length and depth in said tube and turn up a ridge of appreciable size.

14. A tube coupling comprising a body having a rearwardly facing abutting face and a bore with which a tube is to have fluid connection, a coupling member having a bore through which the tube passes and having a forwardly facing outwardly flaring camming shoulder spaced from said body and movable toward the same, a coupling element having a rearwardly disposed thickened axially inflexible ring part with a bore encircling the tube, said coupling element lying between said abutting face and said shoulder and said ring part having an inner radial face forming with said bore in the ring part of the coupling element an internal cutting edge and having an outer radial portion spaced longitudinally forwardly of said inner face, said coupling element also having an axially flexible, thin walled tubular part carried by said ring part and engaging said abutting face to resist yieldably longitudinal movement of said ring part toward the body, said flexible tubular part lying radially between the said inner radial face and said outer radial portion and being spaced from said tube, said ring part having a forwardly and outwardly inclined rearward surface of greater angle than and juxtaposed to said camming shoulder with the outer margin outwardly spaced from said flexible part and near the radial plane of the said inner radial face to engage said camming shoulder at said outer margin when the ring part of said coupling element is moved toward the body, said flexible part resisting forward movement of said ring part of the coupling element to induce forward rolling motion of the ring part and constriction of the cutting edge into the tube and thereby flexing and weakening the flexible part and thereafter buckling the same under axial movement of the ring part of the coupling element toward said abutting face with axial and radial cutting action of said edge into the tube.

15. In the tube coupling combination of a body to the rearward end of which a tube is to be coupled, a nut coacting with the body and having a bore through which the tube extends and having an internal conical surface adjacent the bore and facing the body, and a coupling element encircling the tube and disposed between the body and the said conical surface of the nut and adapted to be forcibly worked therebetween to reduced axial length and into engagement with the tube, the forward end of said coupling element bearing substantially immovably on the rearward end of said body during said working of said element, the improvement that said coupling element comprise a ring part of substantial radial thickness having a substantially cylindrical bore freely encompassing the tube and having a forward face of limited radial height adjacent the bore of the ring and facing the body and defining a circular edge at the forward end of its bore and having a rearward inclined substantially frusto-conical surface spaced away from said face and said edge and pitched forwardly at from about 30° to 60° to the axis of said bore and terminating outwardly in an annular corner disposed longitudinally proximate said edge and radially remote therefrom and having a radially outwardly disposed portion extending forwardly from said corner and overlying said face and edge, said element also comprising a flexible hollow cylindrical tubular part integrally extending forwardly from said last named portion and coaxially of said bore of the ring part and of less radial thickness than said portion and of smaller external diameter than said portion and said corner and of length several times its wall thickness and of internal diameter greater than said edge and substantially corresponding to the greater diameter of said face, and that the said conical surface of said nut be pitched at from about 10° to 20° less than the said frusto-conical surface of said ring part and be engageable with said corner whereby said tubular part tends to be buckled inwardly and foreshortened axially and said ring part tends to be rolled forwardly and advanced axially and said edge tends to be constricted and advanced axially when said element is worked between said nut and body.

16. In the tube coupling combination of a body having a rearwardly disposed face and a bore with which the tube is to be coupled for fluid communication, a coupling member associated with the body for forcible forward movement toward the body and having a bore encompassing the tube and having a forwardly facing forwardly and outwardly flaring camming shoulder, a coupling element encompassing the tube between said face and said shoulder and having a forwardly facing internally disposed cutting edge adjacent the tube and being adapted to be worked between said face and said shoulder with appreciable forward and inward tube cutting motion of said edge and into sealing engagement with the tube and said face of the body, and means holding the tube against substantial forward motion while said coupling element is being worked, the improvement that said coupling element comprise a forward end engaging said face and held substantially immovable in respect thereto during said working of said element, a rearward ring part engageable by said shoulder and movable thereby relative to said forward end and forwardly toward said end, and a deformable flexible portion between said end and said ring part yieldably admitting motion of said ring part toward said end when said shoulder is forcibly moved toward said face, said ring part having a bore encircling the tube and having an inner forwardly disposed and forwardly facing surface intersecting the bore and forming said tube cutting edge adjacent the tube, said ring part being approximately as thick as its length and being relatively inflexible in relation to said flexible portion and having an outer and rearwardly disposed inclined surface juxtaposed to said shoulder and more steeply inclined than said shoulder whereby to have initial contact with said shoulder along an outer and forward margin which is radially far from and axially near said cutting edge, said flexible portion having sufficient strength in resistance to forward motion of said ring part to induce constriction of said cutting edge under the influence of said shoulder and said flexible portion tending to be weakened with constriction of said cutting edge and become yielding to forward axial motion of said ring part and to forward axial and inward radial motion of said cutting edge under the forcible influence of said shoulder.

References Cited in the file of this patent

UNITED STATES PATENTS

| Number | Name | Date |
|---|---|---|
| 1,063,026 | Schuermann | June 3, 1913 |
| 1,337,547 | Dohner | Apr. 20, 1920 |
| 1,888,343 | Bohlman et al. | Nov. 22, 1932 |
| 1,969,142 | McIntyre | Aug. 7, 1934 |
| 2,211,856 | Kreidel | Aug. 20, 1940 |
| 2,333,470 | Cowles | Nov. 2, 1943 |
| 2,417,536 | Wurzhurger | Mar. 18, 1947 |
| 2,496,510 | Wolfram | Feb. 7, 1950 |
| 2,503,826 | Lamont | Apr. 11, 1950 |

FOREIGN PATENTS

| Number | Country | Date |
|---|---|---|
| 391,140 | Great Britain | Apr. 18, 1933 |
| 86,771 | Sweden | July 7, 1936 |